US012222668B2

(12) United States Patent
Morikami et al.

(10) Patent No.: US 12,222,668 B2
(45) Date of Patent: Feb. 11, 2025

(54) IMAGE FORMING APPARATUS CAPABLE OF ADJUSTING EMISSION LIGHT AMOUNT OF LIGHT-EMITTING PORTION, AND LIGHT AMOUNT ADJUSTMENT METHOD

(71) Applicant: KYOCERA Document Solutions Inc., Osaka (JP)

(72) Inventors: Ayato Morikami, Osaka (JP); Yasuaki Sakamoto, Osaka (JP); Masaru Watanabe, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/475,521

(22) Filed: Sep. 27, 2023

(65) Prior Publication Data

US 2024/0103419 A1 Mar. 28, 2024

(30) Foreign Application Priority Data

Sep. 28, 2022 (JP) ................................ 2022-154705

(51) Int. Cl.
*G03G 15/00* (2006.01)

(52) U.S. Cl.
CPC ..... *G03G 15/5041* (2013.01); *G03G 15/5058* (2013.01); *G03G 2215/00042* (2013.01); *G03G 2215/00059* (2013.01)

(58) Field of Classification Search
CPC ..... G03G 15/5041; G03G 2215/00042; G03G 2215/00059; G03G 15/5058
See application file for complete search history.

(56) References Cited

U.S. PATENT DOCUMENTS

2009/0141296 A1* 6/2009 Ichinose ............ G03G 15/5058 358/1.9
2014/0119755 A1* 5/2014 Shida ................. G03G 15/5058 399/49

FOREIGN PATENT DOCUMENTS

JP 2004038091 A 2/2004

* cited by examiner

*Primary Examiner* — Sandra Brase
(74) *Attorney, Agent, or Firm* — Alleman Hall & Tuttle LLP

(57) ABSTRACT

An image forming apparatus includes first to third adjustment processing portions. The first adjustment processing portion adjusts an emission light amount of a light-emitting portion of a first sensor based on an electric signal output from a light-receiving portion of the first sensor and corresponding to regular reflection light reflected by a non-toner-adhering surface of an image-carrying member. The second adjustment processing portion adjusts an operation condition of an image forming portion based on a toner concentration of a first toner image in a specific color, that has a concentration smaller than a predetermined saturation concentration. The third adjustment processing portion adjusts an emission light amount of a light-emitting portion of a second sensor based on an electric signal output from a light-receiving portion of the second sensor and corresponding to diffuse reflection light reflected by a second toner image in the specific color, that has a predetermined reference concentration.

3 Claims, 4 Drawing Sheets

IMAGE FORMING APPARATUS CAPABLE OF ADJUSTING EMISSION LIGHT AMOUNT OF LIGHT-EMITTING PORTION, AND LIGHT AMOUNT ADJUSTMENT METHOD

INCORPORATION BY REFERENCE

This application is based upon and claims the benefit of priority from the corresponding Japanese Patent Application No. 2022-154705 filed on Sep. 28, 2022, the entire contents of which are incorporated herein by reference.

BACKGROUND

The present disclosure relates to an image forming apparatus that uses electrophotography, and a light amount adjustment method.

There is known an image forming apparatus including a first concentration sensor which senses a toner concentration of a first toner patch in black, that has been formed on an image-carrying member such as an intermediate transfer belt, and a second concentration sensor which senses a toner concentration of a second toner patch in cyan, magenta, or yellow, that has been formed on the image-carrying member. The first concentration sensor includes a first light-emitting portion which emits light toward the image-carrying member and a first light-receiving portion which receives regular reflection light that is emitted from the first light-emitting portion and reflected by the first toner patch and outputs an electric signal corresponding to a received light amount. The second concentration sensor includes a second light-emitting portion which emits light toward the image-carrying member and a second light-receiving portion which receives diffuse reflection light that is emitted from the second light-emitting portion and reflected by the second toner patch and outputs an electric signal corresponding to a received light amount.

Herein, in the image forming apparatus, an accuracy of the first concentration sensor in sensing the toner concentration may be lowered due to an attachment error of the first concentration sensor. In contrast, there is known a technique of adjusting an emission light amount of the first light-emitting portion based on an electric signal that is output from the first light-receiving portion and corresponds to regular reflection light reflected by a surface of the image-carrying member (where toner has not adhered).

Also in the image forming apparatus, an accuracy of the second concentration sensor in sensing the toner concentration may be lowered due to an attachment error of the second concentration sensor. In contrast, there is known, as a related art, an image forming apparatus which adjusts an emission light amount of the second light-emitting portion using the first concentration sensor in which the emission light amount of the first light-emitting portion has been adjusted by the technique described above.

Specifically, in the image forming apparatus according to the related art, an operation condition of a monochrome toner image forming portion which forms a black toner image is adjusted based on a toner concentration of the first toner patch, that is sensed by the first concentration sensor that has been adjusted by the technique described above. Then, an emission light amount of the second light-emitting portion is adjusted based on an electric signal that is output from the second light-receiving portion and corresponds to diffuse reflection light reflected by the first toner patch having a predetermined concentration, that has been formed by the monochrome toner image forming portion after the adjustment of the operation condition.

SUMMARY

An image forming apparatus according to an aspect of the present disclosure includes an image-carrying member, a specific toner image forming portion, a first concentration sensor, a second concentration sensor, a first adjustment processing portion, a second adjustment processing portion, and a third adjustment processing portion. The image-carrying member carries a toner image. The specific toner image forming portion forms a toner image on the image-carrying member using toner of a predetermined specific color different from black. The first concentration sensor includes a first light-emitting portion which emits light toward the image-carrying member and a first light-receiving portion which receives regular reflection light that is emitted from the first light-emitting portion and reflected by the image-carrying member and outputs an electric signal corresponding to a received light amount, the first concentration sensor being used to sense a toner concentration of a black toner image formed on the image-carrying member. The second concentration sensor includes a second light-emitting portion which emits light toward the image-carrying member and a second light-receiving portion which receives diffuse reflection light that is emitted from the second light-emitting portion and reflected by the image-carrying member and outputs an electric signal corresponding to a received light amount, the second concentration sensor being used to sense a toner concentration of a toner image in the specific color, that is formed on the image-carrying member. The first adjustment processing portion adjusts an emission light amount of the first light-emitting portion based on an electric signal that is output from the first light-receiving portion and corresponds to regular reflection light reflected by a surface of the image-carrying member where toner has not adhered. The second adjustment processing portion adjusts an operation condition of the specific toner image forming portion based on a toner concentration of a first toner image in the specific color, that has a concentration smaller than a predetermined saturation concentration, the toner concentration of the first toner image being sensed by the first concentration sensor after the adjustment of the emission light amount of the first light-emitting portion by the first adjustment processing portion. The third adjustment processing portion adjusts an emission light amount of the second light-emitting portion based on an electric signal that is output from the second light-receiving portion and corresponds to diffuse reflection light reflected by a second toner image in the specific color, that has a predetermined reference concentration, the second toner image having been formed by the specific toner image forming portion after the adjustment of the operation condition by the second adjustment processing portion.

A light amount adjustment method according to another aspect of the present disclosure is executed in an image forming apparatus including: an image-carrying member which carries a toner image; a specific toner image forming portion which forms a toner image on the image-carrying member using toner of a predetermined specific color different from black; a first concentration sensor which includes a first light-emitting portion which emits light toward the image-carrying member and a first light-receiving portion which receives regular reflection light that is emitted from the first light-emitting portion and reflected by the image-carrying member and outputs an electric signal corresponding to a received light amount, the first concentration sensor being used to sense a toner concentration of a black toner image formed on the image-carrying member; and a second concentration sensor which includes a second light-emitting portion which emits light toward the image-carrying member and a second light-receiving portion which receives diffuse reflection light that is emitted from the second light-emitting portion and reflected by the image-carrying member and outputs an electric signal corresponding to a received light amount, the second concentration sensor being used to sense a toner concentration of a toner image in the specific color, that is formed on the image-carrying member, the light amount adjustment method including a first adjustment step, a second adjustment step, and a third adjustment step. The first adjustment step includes adjusting an emission light amount of the first light-emitting portion based on an electric signal that is output from the first light-receiving portion and corresponds to regular reflection light reflected by a surface of the image-carrying member where toner has not adhered. The second adjustment step includes adjusting an operation condition of the specific toner image forming portion based on a toner concentration of a first toner image in the specific color, that has a concentration smaller than a predetermined saturation concentration, the toner concentration of the first toner image being sensed by the first concentration sensor after the adjustment of the emission light amount of the first light-emitting portion in the first adjustment step. The third adjustment step includes adjusting an emission light amount of the second light-emitting portion based on an electric signal that is output from the second light-receiving portion and corresponds to diffuse reflection light reflected by a second toner image in the specific color, that has a predetermined reference concentration, the second toner image having been formed by the specific toner image forming portion after the adjustment of the operation condition in the second adjustment step.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the attached drawings. It is noted that the following embodiment is an example of embodying the present disclosure and does not limit the technical scope of the present disclosure.

[Configuration of Image Forming Apparatus 100]

First, a configuration of an image forming apparatus 100 according to the embodiment of the present disclosure will be described with reference to FIG. 1 and FIG. 2.

It is noted that for convenience of descriptions, a vertical direction in a state where the image forming apparatus 100 is installed in a usable state (state shown in FIG. 1) is defined as an up-down direction D1. In addition, a front-rear direction D2 is defined with a surface of the image forming apparatus 100 on a front left side of the diagram shown in FIG. 1 being a front surface (front side). In addition, a left-right direction D3 is defined using the front surface of the image forming apparatus 100 in the installed state as a reference.

The image forming apparatus 100 is an image processing apparatus having a printing function for forming an image based on image data. Specifically, the image forming apparatus 100 is a multifunction peripheral having a plurality of functions including the printing function. It is noted that the image forming apparatus according to the present disclosure may also be a printer, a facsimile apparatus, or a copying machine that is capable of forming an image using electrophotography.

Figure 1:
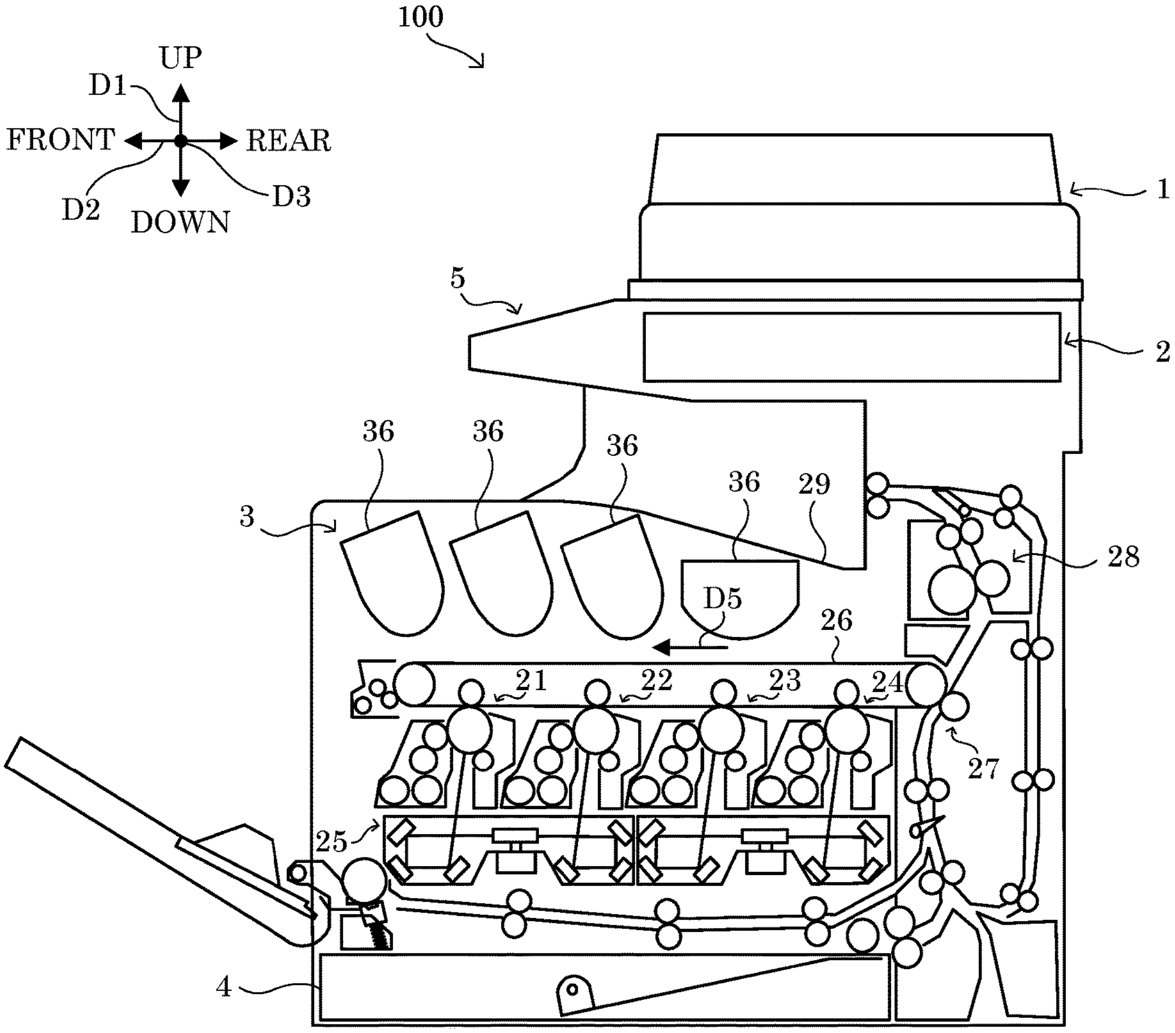
FIG. 1 is a cross-sectional view showing a configuration of an image forming apparatus according to an embodiment of the present disclosure.
Figure 2:
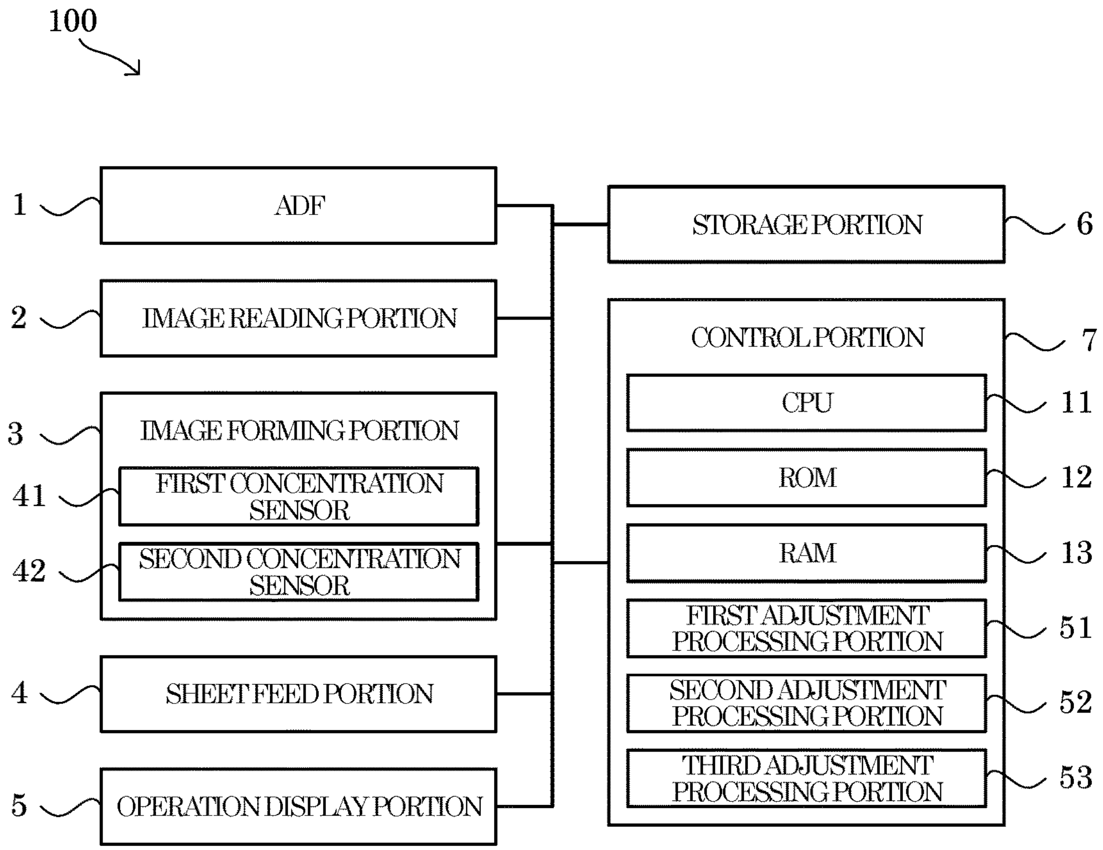
FIG. 2 is a block diagram showing a system configuration of the image forming apparatus according to the embodiment of the present disclosure.

As shown in FIG. 1 and FIG. 2, the image forming apparatus 100 includes an ADF (Auto Document Feed) 1, an image reading portion 2, an image forming portion 3, a sheet feed portion 4, an operation display portion 5, a storage portion 6, and a control portion 7.

The ADF 1 conveys a document sheet an image of which is to be read by the image reading portion 2. The ADF 1 includes a document sheet setting portion, a plurality of conveying rollers, a document sheet holder, and a sheet discharge portion.

The image reading portion 2 realizes a scanning function for reading an image on a document sheet. The image reading portion 2 includes a document sheet table, a light source, a plurality of mirrors, an optical lens, and a CCD (Charge Coupled Device).

The image forming portion 3 realizes the printing function. Specifically, the image forming portion 3 forms a color or monochrome image on a sheet supplied from the sheet feed portion 4 using electrophotography.

The sheet feed portion 4 supplies a sheet to the image forming portion 3. The sheet feed portion 4 includes a sheet feed cassette, a manual feed tray, and a plurality of conveying rollers.

The operation display portion 5 is a user interface of the image forming apparatus 100. The operation display portion 5 includes a display portion and an operation portion. The display portion displays various types of information in response to control instructions from the control portion 7. The display portion is, for example, a liquid crystal display. The operation portion is used for inputting various types of information to the control portion 7 in accordance with user operations. The operation portion is, for example, a touch panel.

The storage portion 6 is a nonvolatile storage device. For example, the storage portion 6 is a nonvolatile memory such as a flash memory. It is noted that the storage portion 6 may also be an SSD (Solid State Drive) or an HDD (Hard Disk Drive).

The control portion 7 collectively controls the image forming apparatus 100. As shown in FIG. 2, the control portion 7 includes a CPU 11, a ROM 12, and a RAM 13. The CPU 11 is a processor which executes various types of calculation processing. The ROM 12 is a nonvolatile storage device in which information such as control programs for causing the CPU 11 to execute various types of processing is stored in advance. The RAM 13 is a volatile or nonvolatile storage device which is used as a temporary storage memory (working area) for the various types of processing executed by the CPU 11. The CPU 11 executes the various control programs stored in advance in the ROM 12, to thus collectively control the image forming apparatus 100.

It is noted that the control portion 7 may be a control portion provided separately from a main control portion that collectively controls the image forming apparatus 100. Alternatively, the control portion 7 may be constituted by an electronic circuit such as an integrated circuit (ASIC).

[Configuration of Image Forming Portion 3]

Next, a configuration of the image forming portion 3 will be described with reference to FIG. 1 to FIG. 5. Herein, FIG. 3 is a cross-sectional view showing a configuration of an image forming unit 24.

As shown in FIG. 1, the image forming portion 3 includes a plurality of image forming units 21 to 24, a laser scanning unit 25, an intermediate transfer belt 26, a secondary transfer roller 27, a fixing device 28, and a sheet discharge tray 29. Further, as shown in FIG. 2 and FIG. 3, the image forming portion 3 includes a first concentration sensor 41 and a second concentration sensor 42.

The image forming unit 21 forms a toner image on the intermediate transfer belt 26 using Y (yellow) toner. The image forming unit 22 forms a toner image on the intermediate transfer belt 26 using C (cyan) toner. The image forming unit 23 forms a toner image on the intermediate transfer belt 26 using M (magenta) toner. The image forming unit 24 forms a toner image on the intermediate transfer belt 26 using K (black) toner. As shown in FIG. 1, the image forming units 21 to 24 are arranged next to one other along the front-rear direction D2 of the image forming apparatus 100 in the stated order of yellow, cyan, magenta, and black from the front side of the image forming apparatus 100. The image forming units 21 to 23 are an example of a plurality of toner image forming portions according to the present disclosure.

Figure 3:
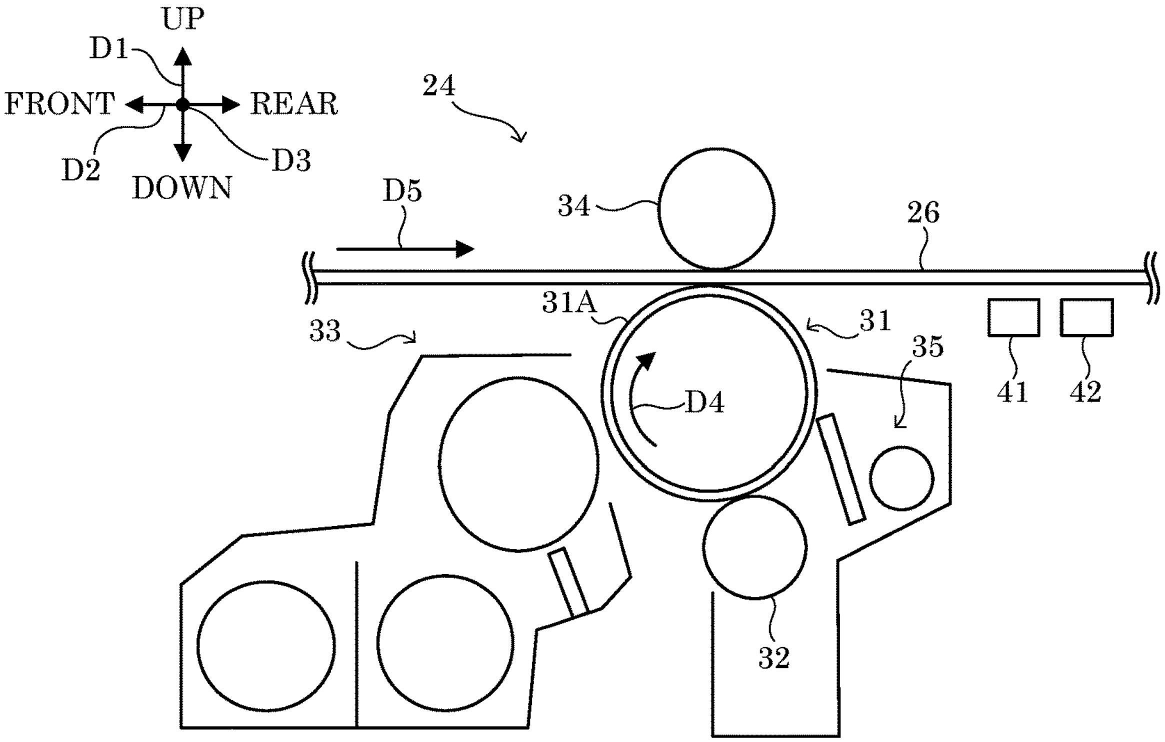
FIG. 3 is a cross-sectional view showing a configuration of an image forming unit in the image forming apparatus according to the embodiment of the present disclosure.

As shown in FIG. 3, the image forming unit 24 includes a photoconductor drum 31, a charging roller 32, a developing device 33, a primary transfer roller 34, and a drum cleaning portion 35. The image forming units 21 to 23 also have configurations similar to that of the image forming unit 24. Moreover, each of the image forming units 21 to 24 includes a toner container 36 shown in FIG. 1.

An electrostatic latent image is formed on a surface of the photoconductor drum 31. For example, the photoconductor drum 31 includes a photosensitive layer 31A formed of an organic photosensitive material. Upon receiving a rotational driving force supplied from a motor (not shown), the photoconductor drum 31 rotates in a rotation direction D4 shown in FIG. 3. Thus, the photoconductor drum 31 conveys an electrostatic latent image formed on the surface thereof. It is noted that the photosensitive layer 31A may alternatively be formed by other photosensitive materials such as amorphous silicon.

Upon being applied with a preset charging voltage, the charging roller 32 charges the surface of the photoconductor drum 31. For example, the charging roller 32 charges the surface of the photoconductor drum 31 to a positive polarity. Light that is emitted from the laser scanning unit 25 and is based on image data is irradiated onto the surface of the photoconductor drum 31 charged by the charging roller 32. Thus, an electrostatic latent image is formed on the surface of the photoconductor drum 31.

The developing device 33 develops the electrostatic latent image formed on the surface of the photoconductor drum 31. The developing device 33 includes a pair of stirring members and a developing roller. The pair of stirring members stir developer that is stored inside the developing device 33 and contains toner and carriers. By this stirring, the toner and carriers contained in the developer are frictionally charged. For example, the toner contained in the developer is charged to a positive polarity by friction with the carriers. The developing roller draws the developer stirred by the pair of stirring members and conveys the developer to an opposing area between the developing roller and the photoconductor drum 31. Moreover, upon being applied with a preset developing bias voltage, the developing roller supplies the toner conveyed to the opposing area to the photoconductor drum 31. Thus, the toner is selectively supplied to an exposure area of the photoconductor drum 31 where light emitted from the laser scanning unit 25 has been irradiated, and thus the electrostatic latent image formed on the surface of the photoconductor drum 31 is developed. It is noted that the toner from the toner container 36 is supplied to the developing device 33.

Upon being supplied with a preset primary transfer current, the primary transfer roller 34 transfers the toner image formed on the surface of the photoconductor drum 31 onto an outer circumferential surface of the intermediate transfer belt 26. As shown in FIG. 3, the primary transfer roller 34 is provided opposed to the photoconductor drum 31 with the intermediate transfer belt 26 interposed therebetween.

The drum cleaning portion 35 removes toner that has remained on the surface of the photoconductor drum 31 after the transfer of the toner image by the primary transfer roller 34.

The laser scanning unit 25 emits light that is based on image data toward the surface of the photoconductor drum 31 of each of the image forming units 21 to 24.

The intermediate transfer belt 26 is an endless belt member onto which the toner image that has been formed on the surface of the photoconductor drum 31 of each of the image forming units 21 to 24 is transferred. The intermediate transfer belt 26 is stretched by a drive roller, a tension roller, and the four primary transfer rollers 34 at a predetermined tension. By the drive roller rotating upon receiving a rotational driving force supplied from a motor (not shown), the intermediate transfer belt 26 rotates in a rotation direction D5 shown in FIG. 1 and FIG. 3. The intermediate transfer belt 26 carries a toner image to be transferred onto a sheet. The intermediate transfer belt 26 is an example of an image-carrying member according to the present disclosure.

The secondary transfer roller 27 transfers the toner image transferred onto the surface of the intermediate transfer belt 26 onto a sheet supplied from the sheet feed portion 4.

The fixing device 28 fixes the toner image transferred onto the sheet by the secondary transfer roller 27 onto the sheet.

The sheet onto which the toner image has been fixed by the fixing device 28 is discharged onto the sheet discharge tray 29.

The first concentration sensor 41 is used to sense a toner concentration of a K (black) toner image formed on the intermediate transfer belt 26. As shown in FIG. 3, the first concentration sensor 41 is disposed on a downstream side of the image forming unit 24 in the rotation direction D5 of the intermediate transfer belt 26 and on an upstream side of the secondary transfer roller 27 in the rotation direction D5.

Figure 4:
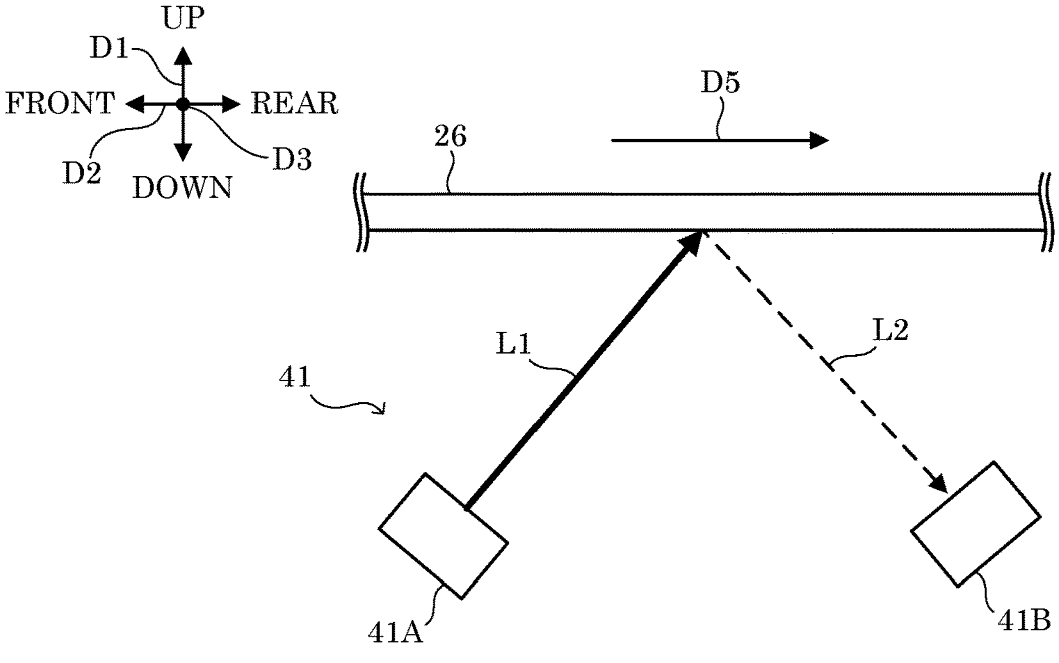
FIG. 4 is a side view showing a configuration of a first concentration sensor in the image forming apparatus according to the embodiment of the present disclosure.

The first concentration sensor 41 is a so-called reflective optical sensor. As shown in FIG. 4, the first concentration sensor 41 includes a first light-emitting portion 41A, a first light-receiving portion 41B, and a housing (not shown) that houses the first light-emitting portion 41A and the first light-receiving portion 41B.

The first light-emitting portion 41A emits light L1 (see FIG. 4) toward the intermediate transfer belt 26. It is noted that in FIG. 4, the light L1 is indicated by a bold line with an arrow. For example, the first light-emitting portion 41A is a light-emitting element such as a light-emitting diode that emits light of a predetermined wavelength. It is noted that the first light-emitting portion 41A may also include a light guide member that guides light emitted from the light-emitting element to the intermediate transfer belt 26.

The first light-receiving portion 41B receives regular reflection light L2 (see FIG. 4) out of light that is emitted from the first light-emitting portion 41A and reflected by the intermediate transfer belt 26, and outputs an electric signal corresponding to a received light amount. It is noted that in FIG. 4, the regular reflection light L2 is indicated by a broken line with an arrow. For example, the first light-receiving portion 41B is a light-receiving element such as a phototransistor. The first light-receiving portion 41B outputs an electric signal indicating a sensing value corresponding to the received light amount of the regular reflection light L2. The electric signal output from the first light-receiving portion 41B is input to the control portion 7.

The second concentration sensor 42 is used to sense toner concentrations of Y (yellow), C (cyan), and M (magenta) toner images formed on the intermediate transfer belt 26. As shown in FIG. 3, similar to the first concentration sensor 41, the second concentration sensor 42 is disposed on the downstream side of the image forming unit 24 in the rotation direction D5 of the intermediate transfer belt 26 and on the upstream side of the secondary transfer roller 27 in the rotation direction D5.

Figure 5:
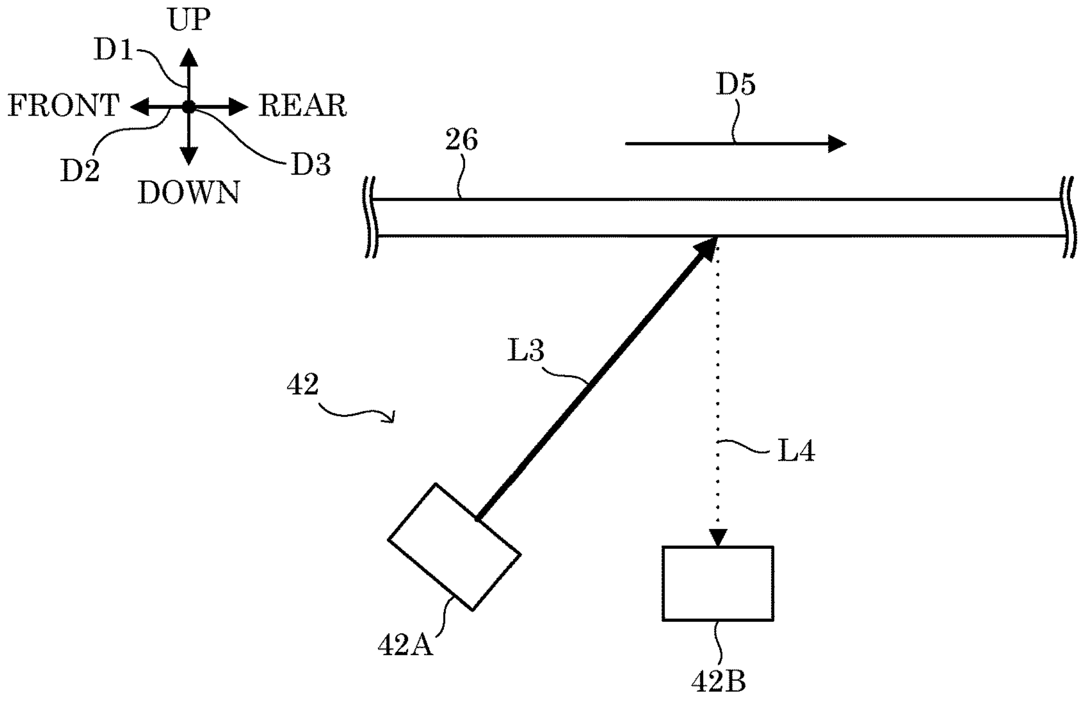
FIG. 5 is a side view showing a configuration of a second concentration sensor in the image forming apparatus according to the embodiment of the present disclosure.

The second concentration sensor 42 is a so-called reflective optical sensor. As shown in FIG. 5, the second concentration sensor 42 includes a second light-emitting portion 42A, a second light-receiving portion 42B, and a housing (not shown) that houses the second light-emitting portion 42A and the second light-receiving portion 42B.

The second light-emitting portion 42A emits light L3 (see FIG. 5) toward the intermediate transfer belt 26. It is noted that in FIG. 5, the light L3 is indicated by a bold line with an arrow. For example, similar to the first light-emitting portion 41A, the second light-emitting portion 42A is a light-emitting element such as a light-emitting diode that emits light of a predetermined wavelength. It is noted that the second light-emitting portion 42A may also include a light guide member that guides light emitted from the light-emitting element to the intermediate transfer belt 26.

The second light-receiving portion 42B receives diffuse reflection light L4 (see FIG. 5) out of light that is emitted from the second light-emitting portion 42A and reflected by the intermediate transfer belt 26, and outputs an electric signal corresponding to a received light amount. It is noted that in FIG. 5, the diffuse reflection light L4 is indicated by a dotted line with an arrow. For example, similar to the first light-receiving portion 41B, the second light-receiving portion 42B is a light-receiving element such as a phototransistor. The second light-receiving portion 42B outputs an electric signal indicating a sensing value corresponding to the received light amount of the diffuse reflection light L4. The electric signal output from the second light-receiving portion 42B is input to the control portion 7.

Based on the electric signal input from the first light-receiving portion 41B of the first concentration sensor 41, the control portion 7 senses a toner concentration of the K (black) toner image formed on the intermediate transfer belt 26. In addition, based on the electric signal input from the second light-receiving portion 42B of the second concentration sensor 42, the control portion 7 senses toner concentrations of the Y (yellow), C (cyan), and M (magenta) toner images formed on the intermediate transfer belt 26.

Incidentally, in the image forming apparatus 100, an accuracy of the first concentration sensor 41 in sensing the toner concentration may be lowered due to an attachment error of the first concentration sensor 41. In contrast, there is known a technique of adjusting an emission light amount of the first light-emitting portion 41A based on an electric signal that is output from the first light-receiving portion 41B and corresponds to the regular reflection light L2 reflected by the surface of the intermediate transfer belt 26 (where toner has not adhered).

Also in the image forming apparatus 100, an accuracy of the second concentration sensor 42 in sensing the toner concentrations may be lowered due to an attachment error of the second concentration sensor 42. In contrast, there is known, as a related art, an image forming apparatus which adjusts an emission light amount of the second light-emitting portion 42A using the first concentration sensor 41 in which the emission light amount of the first light-emitting portion 41A has been adjusted by the technique described above.

Specifically, in the image forming apparatus according to the related art, an operation condition of the image forming unit 24 is adjusted based on a toner concentration of a K (black) toner patch, that is sensed by the first concentration sensor 41 that has been adjusted by the technique described above. Then, an emission light amount of the second light-emitting portion 42A is adjusted based on an electric signal that is output from the second light-receiving portion 42B and corresponds to the diffuse reflection light L4 reflected by the K (black) toner patch having a predetermined concentration, that has been formed by the image forming unit 24 after the adjustment of the operation condition.

However, in the K (black) toner image, diffuse reflection of light hardly occurs. Therefore, in the image forming apparatus according to the related art, the emission light amount of the second light-emitting portion 42A needs to be increased significantly when adjusting the emission light amount of the second light-emitting portion 42A.

In contrast, in the image forming apparatus 100 according to the embodiment of the present disclosure, the emission light amount of the second light-emitting portion 42A can be adjusted without significantly increasing the emission light amount of the second light-emitting portion 42A as will be described below.

[Configuration of Control Portion 7]

Next, a configuration of the control portion 7 will be described with reference to FIG. 2.

As shown in FIG. 2, the control portion 7 includes a first adjustment processing portion 51, a second adjustment processing portion 52, and a third adjustment processing portion 53.

Specifically, a light amount adjustment program for causing the CPU 11 of the control portion 7 to function as the respective portions described above is stored in advance in the ROM 12 of the control portion 7. Then, the CPU 11 of the control portion 7 executes the light amount adjustment program stored in the ROM 12 to thus function as the respective functional portions described above. It is noted that some or all of the functional portions included in the control portion 7 may be constituted by an electronic circuit. Alternatively, the light amount adjustment program may be a program for causing a plurality of processors to function as the respective functional portions included in the control portion 7.

The first adjustment processing portion 51 executes first adjustment processing for adjusting the emission light amount of the first light-emitting portion 41A based on an electric signal that is output from the first light-receiving portion 41B and corresponds to the regular reflection light L2 reflected by the surface of the intermediate transfer belt 26 where toner has not adhered.

For example, the first adjustment processing portion 51 causes the first light-emitting portion 41A to emit light L1 toward the surface of the intermediate transfer belt 26 where toner has not adhered. Moreover, the first adjustment processing portion 51 acquires a sensing value of the electric signal output from the first light-receiving portion 41B in accordance with the emission of the light L1 by the first light-emitting portion 41A. Then, the first adjustment processing portion 51 adjusts a magnitude of a current supplied to the first light-emitting portion 41A so that the acquired sensing value becomes a predetermined first reference value. For example, the first adjustment processing portion 51 gradually increases the current supplied to the first light-emitting portion 41A so that the acquired sensing value becomes the first reference value. In addition, the first adjustment processing portion 51 may acquire a primary expression representing a relationship between the current supplied to the first light-emitting portion 41A and the acquired sensing value, and specify a current corresponding to the first reference value based on the primary expression.

The second adjustment processing portion 52 executes second adjustment processing for adjusting an operation condition of a specific image forming unit corresponding to a predetermined specific color different from K (black) based on a toner concentration of a first toner image in the specific color, that has a concentration smaller than a predetermined saturation concentration, the toner concentration of the first toner image being sensed by the first concentration sensor 41 in which the emission light amount of the first light-emitting portion 41A has been adjusted by the first adjustment processing portion 51.

Herein, the saturation concentration is a concentration of the specific color at which a linear decrease of the light amount of the regular reflection light L2, that corresponds to a rise of the concentration of the toner image in the specific color irradiated with the light L1, is saturated. In other words, in a concentration range equal to or smaller than the saturation concentration, the light amount of the regular reflection light L2 linearly decreases in accordance with the rise of the concentration of the toner image in the specific color irradiated with the light L1. Further, in a concentration range exceeding the saturation concentration, even when the concentration of the toner image in the specific color irradiated with the light L1 rises, the light amount of the regular reflection light L2 hardly changes.

For example, the specific color is Y (yellow). In this case, the first toner image is a Y (yellow) toner image that has a concentration smaller than the saturation concentration. In addition, the specific image forming unit is the image forming unit 21. The image forming unit 21 is an example of a specific toner image forming portion according to the present disclosure.

For example, the operation condition adjusted by the second adjustment processing portion 52 is the developing bias voltage.

For example, the second adjustment processing portion 52 adjusts the developing bias voltage of the image forming unit 21 by the following procedures.

First, the second adjustment processing portion 52 acquires a plurality of concentrations of the first toner image that correspond to a plurality of setting values of the developing bias voltage.

Specifically, the second adjustment processing portion 52 applies the charging voltage to the charging roller 32 of the image forming unit 21, and charges the photoconductor drum 31 of the image forming unit 21. The second adjustment processing portion 52 also inputs first adjustment image data corresponding to the first toner image to the laser scanning unit 25, to thus cause an electrostatic latent image that is based on the first adjustment image data to be formed on the surface of the photoconductor drum 31 of the image forming unit 21. Further, the second adjustment processing portion 52 applies the developing bias voltage set to any of the plurality of setting values to the developing device 33 of the image forming unit 21, to thus cause the first toner image to be formed on the surface of the photoconductor drum 31 of the image forming unit 21. Furthermore, the second adjustment processing portion 52 supplies the primary transfer current to the primary transfer roller 34 of the image forming unit 21, to thus cause the first toner image formed on the photoconductor drum 31 of the image forming unit 21 to be transferred onto the intermediate transfer belt 26. In addition, at a timing at which the first toner image conveyed by the intermediate transfer belt 26 reaches an irradiation position of the light L1 by the first light-emitting portion 41A, the second adjustment processing portion 52 causes the first light-emitting portion 41A in which the emission light amount has been adjusted by the first adjustment processing to emit the light L1. Moreover, the second adjustment processing portion 52 acquires a sensing value of the electric signal that is output from the first light-receiving portion 41B in accordance with the emission of the light L1 by the first light-emitting portion 41A and corresponds to the regular reflection light L2 reflected by the first toner image. Further, the second adjustment processing portion 52 acquires a toner concentration of the first toner image corresponding to the one of the setting values based on the acquired sensing value. Then, the second adjustment processing portion 52 executes the procedures described above for each of the setting values, to thus acquire the plurality of concentrations of the first toner image that correspond to the plurality of setting values.

Next, the second adjustment processing portion 52 acquires a relational expression representing a relationship between the developing bias voltage and the concentration of the first toner image based on the plurality of acquired concentrations of the first toner image that correspond to the plurality of setting values. The relational expression is, for example, a primary expression.

Then, the second adjustment processing portion 52 uses the relational expression to adjust an intensity of the developing bias voltage so that the concentration of the first toner image becomes a predetermined second reference value.

It is noted that the specific color may alternatively be C (cyan) or M (magenta). Alternatively, the specific color may be a color different from any of Y (yellow), C (cyan), and M (magenta).

Herein, the specific color is desirably a color with which a reflected amount of the light L1 emitted from the first light-emitting portion 41A becomes smallest out of Y (yellow), C (cyan), and M (magenta). This is because, as the reflected amount of the light L1 emitted from the first light-emitting portion 41A becomes smaller, a width of a decrease of the light amount of the regular reflection light L2 corresponding to the increase in concentration up to the saturation concentration becomes larger, to thus result in an improvement in accuracy of the second adjustment processing portion 52 in adjusting the operation condition of the specific image forming unit. It is noted that the color with which the reflected amount of the light L1 emitted from the first light-emitting portion 41A becomes smallest out of Y (yellow), C (cyan), and M (magenta) can be specified based on the color (wavelength) of the light L1 emitted from the first light-emitting portion 41A.

Alternatively, the operation condition of the specific image forming unit that is adjusted by the second adjustment processing portion 52 may be the charging voltage, the amount of light emitted from the laser scanning unit 25, or the primary transfer current.

The third adjustment processing portion 53 executes a third adjustment processing for adjusting an emission light amount of the second light-emitting portion 42A based on an electric signal that is output from the second light-receiving portion 42B and corresponds to diffuse reflection light L4 reflected by a second toner image in the specific color, that has a predetermined reference concentration, the second toner image having been formed by the specific image forming unit after the adjustment of the operation condition by the second adjustment processing portion 52.

For example, the third adjustment processing portion 53 applies the charging voltage to the charging roller 32 of the image forming unit 21, and charges the photoconductor drum 31 of the image forming unit 21. The third adjustment processing portion 53 also inputs second adjustment image data corresponding to the second toner image to the laser scanning unit 25, to thus cause an electrostatic latent image that is based on the second adjustment image data to be formed on the surface of the photoconductor drum 31 of the image forming unit 21. Further, the third adjustment processing portion 53 applies the developing bias voltage adjusted by the second adjustment processing to the developing device 33 of the image forming unit 21, to thus cause the second toner image to be formed on the surface of the photoconductor drum 31 of the image forming unit 21. Furthermore, the third adjustment processing portion 53 supplies the primary transfer current to the primary transfer roller 34 of the image forming unit 21, to thus cause the second toner image formed on the photoconductor drum 31 of the image forming unit 21 to be transferred onto the intermediate transfer belt 26. In addition, at a timing at which the second toner image conveyed by the intermediate transfer belt 26 reaches an irradiation position of the light L3 by the second light-emitting portion 42A, the third adjustment processing portion 53 causes the second light-emitting portion 42A to emit the light L3. Moreover, the third adjustment processing portion 53 acquires a sensing value of the electric signal that is output from the second light-receiving portion 42B in accordance with the emission of the light L3 by the second light-emitting portion 42A and corresponds to the diffuse reflection light L4 reflected by the second toner image. Then, the third adjustment processing portion 53 adjusts a magnitude of the current to be supplied to the second light-emitting portion 42A so that the acquired sensing value becomes a predetermined third reference value.

[Light Amount Adjustment Processing]

Figure 6:
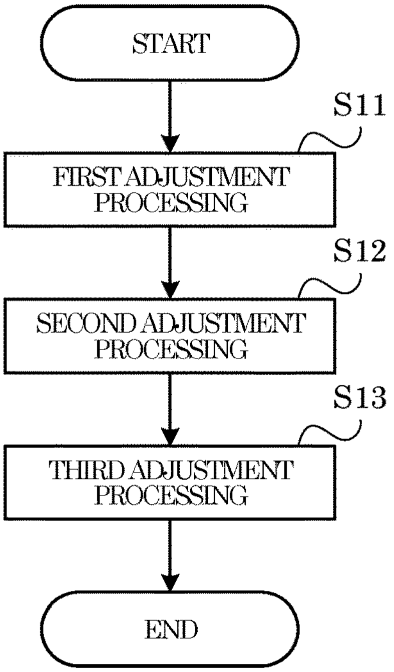
FIG. 6 is a flowchart showing an example of light amount adjustment processing executed in the image forming apparatus according to the embodiment of the present disclosure.

Hereinafter, with reference to FIG. 6, a light amount adjustment method according to the present disclosure will be described along with an example of the light amount adjustment processing executed by the control portion 7 in the image forming apparatus 100. Herein, Step S11, Step S12 . . . represent numbers of processing procedures (steps) executed by the control portion 7. For example, the light amount adjustment processing is executed in response to a predetermined operation made to the operation display portion 5.

<Step S11>

First, in Step S11, the control portion 7 executes the first adjustment processing. Herein, the processing of Step S11 is an example of a first adjustment step according to the present disclosure and is executed by the first adjustment processing portion 51 of the control portion 7.

Specifically, the control portion 7 causes the first light-emitting portion 41A to emit light L1 toward the surface of the intermediate transfer belt 26 where toner has not adhered. Further, the control portion 7 acquires a sensing value of an electric signal output from the first light-receiving portion 41B in accordance with the emission of the light L1 by the first light-emitting portion 41A. Then, the control portion 7 adjusts the magnitude of the current to be supplied to the first light-emitting portion 41A so that the acquired sensing value becomes the first reference value.

<Step S12>

In Step S12, the control portion 7 executes the second adjustment processing. Herein, the processing of Step S12 is an example of a second adjustment step according to the present disclosure and is executed by the second adjustment processing portion 52 of the control portion 7.

Specifically, the control portion 7 applies the charging voltage to the charging roller 32 of the image forming unit 21, and charges the photoconductor drum 31 of the image forming unit 21. The control portion 7 also inputs the first adjustment image data to the laser scanning unit 25, to thus cause an electrostatic latent image that is based on the first adjustment image data to be formed on the surface of the photoconductor drum 31 of the image forming unit 21. Further, the control portion 7 applies the developing bias voltage set to any of the plurality of setting values to the developing device 33 of the image forming unit 21, to thus cause the first toner image to be formed on the surface of the photoconductor drum 31 of the image forming unit 21. Furthermore, the control portion 7 supplies the primary transfer current to the primary transfer roller 34 of the image forming unit 21, to thus cause the first toner image formed on the photoconductor drum 31 of the image forming unit 21 to be transferred onto the intermediate transfer belt 26. In addition, at a timing at which the first toner image conveyed by the intermediate transfer belt 26 reaches the irradiation position of the light L1 by the first light-emitting portion 41A, the control portion 7 causes the first light-emitting portion 41A in which the emission light amount has been adjusted by the processing of Step S11 to emit the light L1. Moreover, the control portion 7 acquires a sensing value of the electric signal that is output from the first light-receiving portion 41B in accordance with the emission of the light L1 by the first light-emitting portion 41A and corresponds to the regular reflection light L2 reflected by the first toner image. Further, the control portion 7 acquires a toner concentration of the first toner image corresponding to the one of the setting values based on the acquired sensing value. Furthermore, the control portion 7 executes the procedures described above for each of the setting values, to thus acquire the plurality of concentrations of the first toner image that correspond to the plurality of setting values. Moreover, the control portion 7 acquires the relational expression based on the plurality of acquired concentrations of the first toner image that correspond to the plurality of setting values. Then, the control portion 7 uses the relational expression to adjust an intensity of the developing bias voltage so that the concentration of the first toner image becomes the second reference value.

<Step S13>

In Step S13, the control portion 7 executes the third adjustment processing. Herein, the processing of Step S13 is an example of a third adjustment step according to the present disclosure and is executed by the third adjustment processing portion 53 of the control portion 7.

Specifically, the control portion 7 applies the charging voltage to the charging roller 32 of the image forming unit 21, and charges the photoconductor drum 31 of the image forming unit 21. The control portion 7 also inputs the second adjustment image data to the laser scanning unit 25, to thus cause an electrostatic latent image that is based on the second adjustment image data to be formed on the surface of the photoconductor drum 31 of the image forming unit 21. Further, the control portion 7 applies the developing bias voltage adjusted by the processing of Step S12 to the developing device 33 of the image forming unit 21, to thus cause the second toner image to be formed on the surface of the photoconductor drum 31 of the image forming unit 21. Furthermore, the control portion 7 supplies the primary transfer current to the primary transfer roller 34 of the image forming unit 21, to thus cause the second toner image formed on the photoconductor drum 31 of the image forming unit 21 to be transferred onto the intermediate transfer belt 26. In addition, at a timing at which the second toner image conveyed by the intermediate transfer belt 26 reaches the irradiation position of the light L3 by the second light-emitting portion 42A, the control portion 7 causes the second light-emitting portion 42A to emit the light L3. Moreover, the control portion 7 acquires a sensing value of the electric signal that is output from the second light-receiving portion 42B in accordance with the emission of the light L3 by the second light-emitting portion 42A and corresponds to the diffuse reflection light L4 reflected by the second toner image. Then, the control portion 7 adjusts a magnitude of the current to be supplied to the second light-emitting portion 42A so that the acquired sensing value becomes the third reference value.

In this manner, in the image forming apparatus 100, the operation condition of the specific image forming unit corresponding to the specific color is adjusted based on the toner concentration of the first toner image in a color different from K (black) (the specific color), that is sensed by the first concentration sensor 41 having the adjusted the emission light amount of the first light-emitting portion 41A. Then, the emission light amount of the second light-emitting portion 42A is adjusted based on the electric signal that is output from the second light-receiving portion 42B and corresponds to the diffuse reflection light L4 reflected by the second toner image in a color different from K (black) (the specific color), that has been formed by the specific image forming unit after the adjustment of the operation condition. Thus, the emission light amount of the second light-emitting portion 42A can be adjusted without using a black toner image. Therefore, the emission light amount of the second light-emitting portion 42A can be adjusted without significantly increasing the emission light amount of the second light-emitting portion 42A.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus, comprising:

an image-carrying member which carries a toner image;

a specific toner image forming portion which forms a toner image on the image-carrying member using toner of a predetermined specific color different from black;

a first concentration sensor which includes a first light-emitting portion which emits light toward the image-carrying member and a first light-receiving portion which receives regular reflection light that is emitted from the first light-emitting portion and reflected by the image-carrying member and outputs an electric signal corresponding to a received light amount, the first concentration sensor being used to sense a toner concentration of a black toner image formed on the image-carrying member;

a second concentration sensor which includes a second light-emitting portion which emits light toward the image-carrying member and a second light-receiving portion which receives diffuse reflection light that is emitted from the second light-emitting portion and reflected by the image-carrying member and outputs an electric signal corresponding to a received light amount, the second concentration sensor being used to sense a toner concentration of a toner image in the specific color, that is formed on the image-carrying member;

a first adjustment processing portion which adjusts an emission light amount of the first light-emitting portion based on an electric signal that is output from the first light-receiving portion and corresponds to regular reflection light reflected by a surface of the image-carrying member where toner has not adhered;

a second adjustment processing portion which adjusts an operation condition of the specific toner image forming portion based on a toner concentration of a first toner image in the specific color, that has a concentration smaller than a predetermined saturation concentration, the toner concentration of the first toner image being sensed by the first concentration sensor after the adjustment of the emission light amount of the first light-emitting portion by the first adjustment processing portion; and a third adjustment processing portion which adjusts an emission light amount of the second light-emitting portion based on an electric signal that is output from the second light-receiving portion and corresponds to diffuse reflection light reflected by a second toner image in the specific color, that has a predetermined reference concentration, the second toner image having been formed by the specific toner image forming portion after the adjustment of the operation condition by the second adjustment processing portion.

2. The image forming apparatus according to claim 1, further comprising a plurality of toner image forming portions which are provided to respectively correspond to a plurality of predetermined colors different from black, and form toner images on the image-carrying member using toner of the plurality of colors respectively corresponding thereto, wherein the specific color is a color with which a reflected amount of light emitted from the first light-emitting portion becomes smallest out of the plurality of colors respectively corresponding to the plurality of toner image forming portions.

3. A light amount adjustment method executed in an image forming apparatus including: an image-carrying member which carries a toner image; a specific toner image forming portion which forms a toner image on the image-carrying member using toner of a predetermined specific color different from black; a first concentration sensor which includes a first light-emitting portion which emits light toward the image-carrying member and a first light-receiving portion which receives regular reflection light that is emitted from the first light-emitting portion and reflected by the image-carrying member and outputs an electric signal corresponding to a received light amount, the first concentration sensor being used to sense a toner concentration of a black toner image formed on the image-carrying member; and a second concentration sensor which includes a second light-emitting portion which emits light toward the image-carrying member and a second light-receiving portion which receives diffuse reflection light that is emitted from the second light-emitting portion and reflected by the image-carrying member and outputs an electric signal corresponding to a received light amount, the second concentration sensor being used to sense a toner concentration of a toner image in the specific color, that is formed on the image-carrying member, the light amount adjustment method comprising:

a first adjustment step of adjusting an emission light amount of the first light-emitting portion based on an electric signal that is output from the first light-receiving portion and corresponds to regular reflection light reflected by a surface of the image-carrying member where toner has not adhered;

a second adjustment step of adjusting an operation condition of the specific toner image forming portion based on a toner concentration of a first toner image in the specific color, that has a concentration smaller than a predetermined saturation concentration, the toner concentration of the first toner image being sensed by the first concentration sensor after the adjustment of the emission light amount of the first light-emitting portion in the first adjustment step; and a third adjustment step of adjusting an emission light amount of the second light-emitting portion based on an electric signal that is output from the second light-receiving portion and corresponds to diffuse reflection light reflected by a second toner image in the specific color, that has a predetermined reference concentration, the second toner image having been formed by the specific toner image forming portion after the adjustment of the operation condition in the second adjustment step.

* * * * *